No. 776,363. PATENTED NOV. 29, 1904.
O. SNYDER.
SERVICE TABLEWARE.
APPLICATION FILED NOV. 8, 1902.
NO MODEL.

Witnesses
Charles Hanimann.
Samuel L. Sargent.

Oscar Snyder Inventor
By his Attorney

No. 776,363. Patented November 29, 1904.

UNITED STATES PATENT OFFICE.

OSCAR SNYDER, OF NEW YORK, N. Y., ASSIGNOR OF TWO-FIFTHS TO
I. HENRY HARRIS AND JACOB MICHAELS, OF NEW YORK, N. Y.

SERVICE-TABLEWARE.

SPECIFICATION forming part of Letters Patent No. 776,363, dated November 29, 1904.

Application filed November 8, 1902. Serial No. 130,490. (No model.)

*To all whom it may concern:*

Be it known that I, OSCAR SNYDER, a citizen of the United States, residing at New York city, in the county of New York and State of New York, have invented certain new and useful Improvements in Service-Tableware, of which the following is a specification, reference being had therein to the accompanying drawings.

My invention relates to table-service ware; and the object of the same is to provide an article of tableware for individual use which will keep the edible contents of the service at the required temperature and to present a dish of attractive appearance in serving certain viands.

My invention is more particularly designed for the purpose of serving oyster cocktails, and it is a well-known fact that this popular relish loses the greater part of its piquant effect if permitted to become warm. In fact, warm raw oysters are, to say the least, unpalatable, if not positively insipid or nauseous. Prior to the use of my service oyster cocktails were served as cold as may be; but in a short time the dish would become sufficiently warm to destroy the flavor of the oysters and dressing.

The accompanying drawings illustrate a service-dish embodying my invention.

Figure 1:
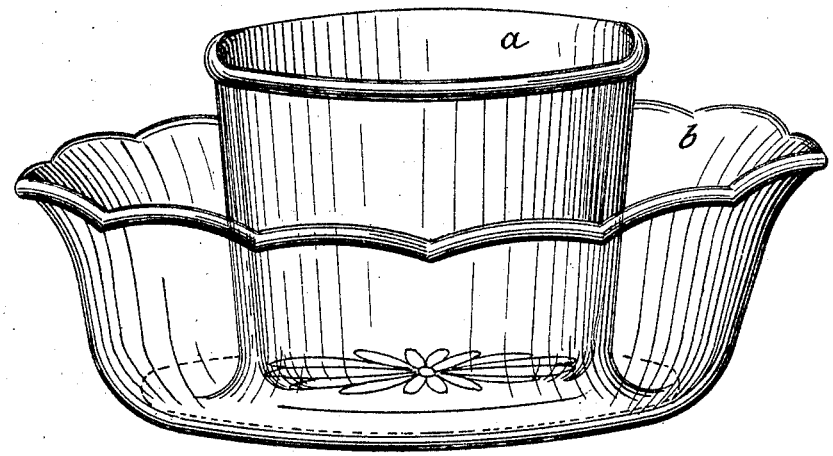
Figure 2:
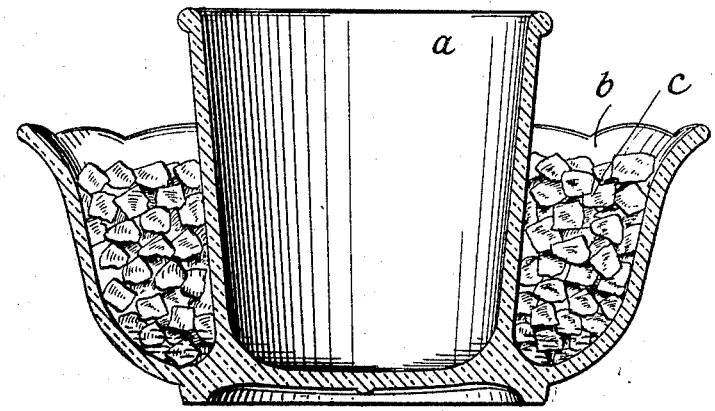

Figure 1 is a perspective view. Fig. 2 is a central vertical section.

As shown, the dish is made in one piece, and it may be made of glass or other suitable materials and should be of attractive design or appearance. The inner or food receptacle $a$ is in shape and size somewhat similar to a glass tumbler and having a rounded or curved bottom and a plain beaded top. Formed integral with the receptacle $a$ is the outer cooling-bowl or ice-receptacle $b$, which has a curved inner bottom surface and an outwardly-flaring annular side wall which terminates in a scalloped top edge. It will be noticed that the upper edge of the ice-receptacle $b$ extends up to about two-thirds the height of the inner receptacle $a$ and that the relative sizes of the two receptacles are such that quite a quantity of cracked ice $c$ will lie against the outer wall of the inner receptacle and provide sufficient space within it to contain a sufficient quantity of the cooled viand. For the purpose designed it is essential that the inner receptacle $a$ shall be of such size that a fork or spoon may be inserted for removing the oysters or the dressing. The entire dish is supported upon a ring or bead formed upon the lower portion of the ice-receptacle $b$, and this serves to hold the dish above the surface of the table, and thus keep the contents at the bottom of the inner receptacle cool.

From the foregoing it will be seen that I have provided an article for individual table service which is novel and attractive in appearance, which will keep the edible contents of the dish at the required temperature to render it palatable, and a piece of ware which can be produced at a comparatively slight cost and which can be readily cleaned, owing to its rounded or curved inner surfaces.

I claim—

The herein-described individual table-service article, comprising a centrally-disposed relatively large food-receptacle having plane inner and outer surfaces and an open upper end, and an integral surrounding open bowl or receptacle for crushed ice, the outer receptacle having an outwardly-flaring annular wall the upper edge of which terminates at a point about two-thirds the height of the inner receptacle, the space between the two receptacles being sufficient to contain a quantity of crushed ice, and both receptacles having curved or rounded inner bottom surfaces in substantially the same horizontal plane, as shown and described.

In testimony whereof I affix my signature in presence of two witnesses.

OSCAR SNYDER.

Witnesses:
 CHAS. W. FORBES,
 CHAS. HANIMANN.